United States Patent [19]

Bitetti

[11] Patent Number: 4,815,322

[45] Date of Patent: Mar. 28, 1989

[54] SPEED INDICATOR DEVICE FOR VEHICLES

[75] Inventor: Rodolfo Bitetti, Milan, Italy

[73] Assignee: Veglia Borletti S.r.l., Milan, Italy

[21] Appl. No.: 134,755

[22] Filed: Dec. 18, 1987

[30] Foreign Application Priority Data

Dec. 19, 1986 [IT] Italy ................... 54221B/86

[51] Int. Cl.⁴ .................. G01P 3/495; G01P 3/56
[52] U.S. Cl. ........................ 73/519; 464/57
[58] Field of Search .............. 73/518, 519; 74/12; 324/173, 174, 166; 464/40, 57, 52, 53, 112, 120; 403/76, 122, 229, 372

[56] References Cited

U.S. PATENT DOCUMENTS

| | | | |
|---|---|---|---|
| 3,625,326 | 12/1971 | Rix et al. | 464/40 |
| 4,241,607 | 12/1980 | Maggia | 73/519 |
| 4,514,109 | 4/1985 | McKenna | 403/372 |
| 4,586,593 | 5/1986 | Danelson et al. | 464/57 |

Primary Examiner—Stewart J. Levy
Assistant Examiner—Robert P. Bell
Attorney, Agent, or Firm—Klauber & Jackson

[57] ABSTRACT

A speed indicator device for vehicles is described, of the type in which the speed indication is given over a scale by an index fitted to an oscillating element drawn for example, by a permanent magnet carried into rotation by the shaft of an electric motor. The device comprises a bush on one side fixed to the magnet and on the other fixed, by a spring, to the shaft of the electric motor.

4 Claims, 2 Drawing Sheets

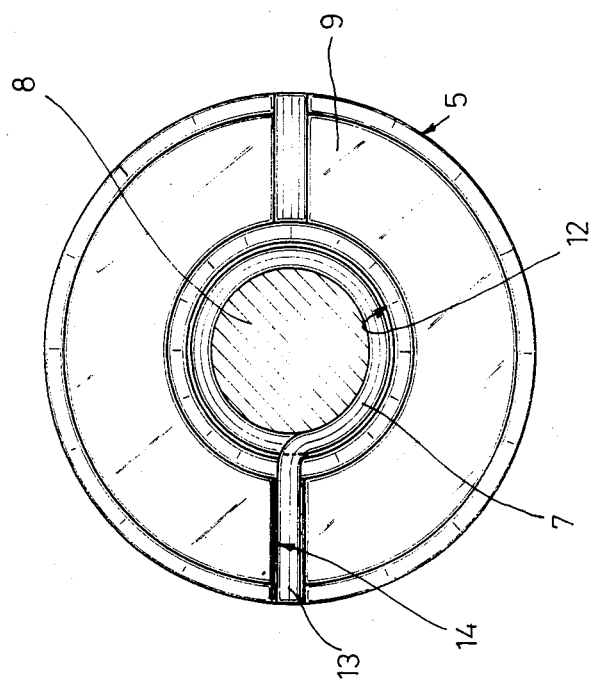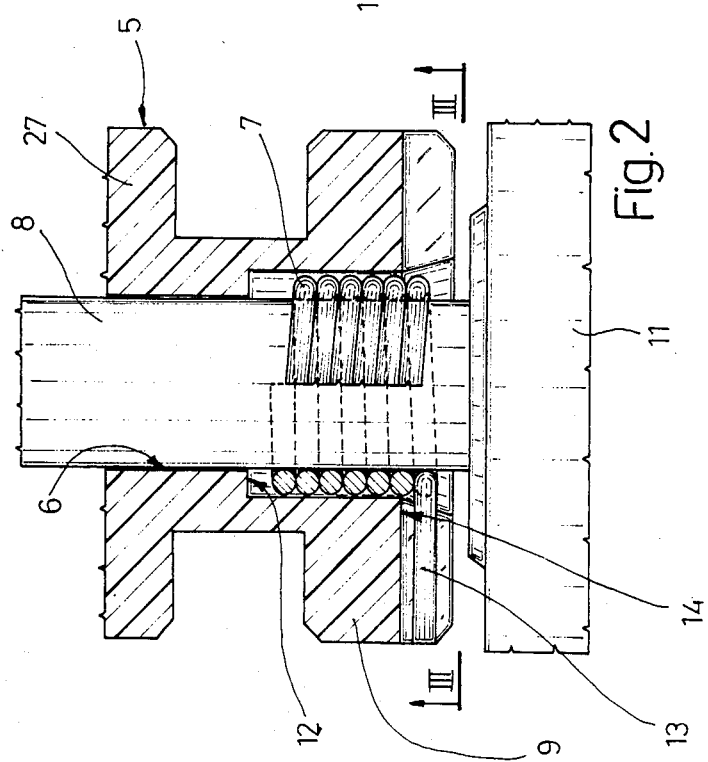

SPEED INDICATOR DEVICE FOR VEHICLES

BACKGROUND OF THE INVENTION

The present invention relates to a speed indicator device for vehicles, of the type in which the speed indication is given by an index fixed to an oscillating element drawn magnetically by a rotatable magnet the rotation of which is controlled by an electric motor.

In currently known devices of the above indicated type the connection between the magnet and the electric motor shaft is formed by means of a bush having an internal hole into which the shaft of the motor is mounted by force-fitting. The bush is then fixed, for example, by means of direct injection to a magnet support frame.

SUMMARY OF THE INVENTION

The object of the present invention is that of providing a speed indicator device for vehicles which will have a different arrangement from that just described for the connection between the output shaft of the electric motor and the said bush, in such a ways to overcome the disadvantages which are encountered in the above described arrangement and which can be summarised in the possibility of breakage of the shaft of the motor during the operation of force-fitting the bush onto the shaft, which is of small diameter and therefore structurally delicate.

The said object is achieved by the present invention in that it relates to a speed indicator device for vehicles, of the type in which the speed indication is given over a scale of an index fixed to an oscillating element drawn magnetically by a rotatable permanent magnet the rotation of which is controlled by an electric motor, characterised by the fact that it includes a bush fixed to the said permanent magnet and having an internal hole in which are housed spring means interposed between the said bush and a shaft of the said electric motor and operable to render the said bush fixed for rotation with the said shaft of said electric motor.

BRIEF DESCRIPTION OF THE DRAWINGS

For a better understanding of the present invention a preferred embodiment is now described, purely by way of non-limitative example, with reference to the attached drawings, in which:

FIG. 2 is a section, on an enlarged scale, of a detail of the device of FIG. 1; and FIG. 3 is a section taken on the line III—III of FIG. 2.

DETAILED DESCRIPTION OF THE INVENTION

Figure 1:
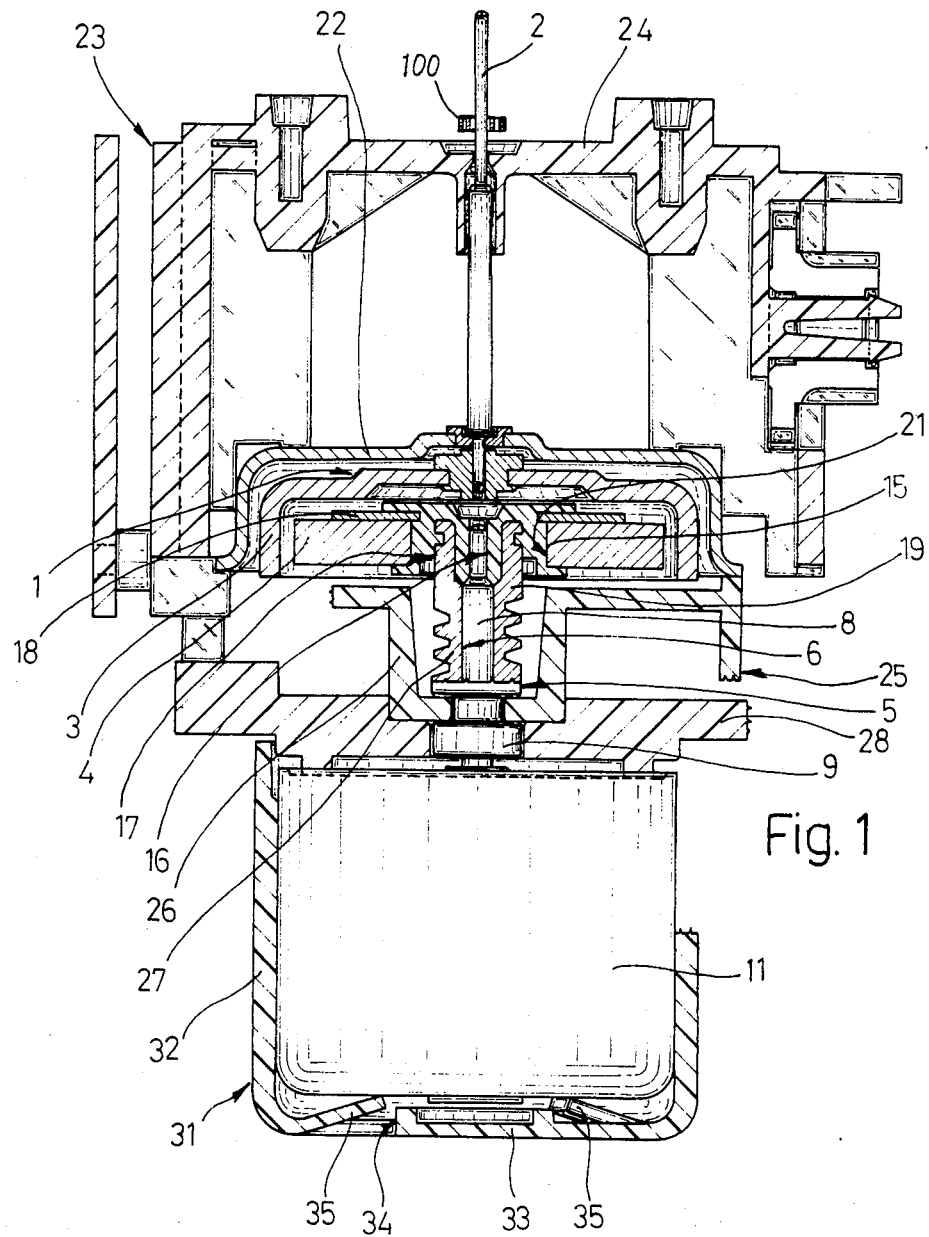
FIG. 1 is a sectional view of a speed indicator device for vehicles.

As illustrated in FIG. 1, the device of the invention substantially comprises an oscillating element generally indicated 1 and constituted by a spindle 2 to which is fixed an index (not illustrated) able to give the speed indication over a scale of the device, and a bell-shaped element 3 to which this spindle 2 is fixed. Within the bell-shaped element 3 is housed a rotatable permanent magnet 4 which is fixed to a bush 5 having an internal hole within which is housed a cylindrical spring 7 (FIG. 2) would around an output shaft 8 of an electric motor 11, able to render the bush 5 fixed for rotation with this shaft 8.

With reference to FIGS. 2 and 3, the hole 6 has a section 12 of greater diameter in correspondence with a lower portion 9 of the bush 5, and in correspondence with this is housed the spring 7 a lower end 13 of which engages a radial notch 14 formed on the lower face of the bush 5. As shown in FIGS. 2 and 3, spring 7 is tightly wound on shaft 8. In use, when the shaft 8 starts to rotate, the spring 7 clamps onto the shaft itself fixing this latter to the bush 5 and therefore to the magnet 4. The clamping of spring 7 onto shaft S is accomplished by frictional forces between shaft 8 and spring 7, resulting in a further coiling or tightening of spring 7 on shaft 8.

The connection between the bush 5 and the magnet 4 is made in any convenient manner, for example, by means of a connection element 15 having a central through hole 16, a section of which houses the upper end of the shaft 8.

Coaxial with this hole 16 in the element 15 is formed an annular seat 17 within which an upper portion 19 of the bush 5 is lodged by force-fitting. The element 15 is fixed to the magnet 4 and can also lock, in a known arrangement, a metal plate 18 functioning as a magnetic shunt. The element 15 can be made, for example, by direct injection of a suitable molten material into the space between the portion 19 of the bush 5 and a central through hole 21 of the magnet 4, to adhere both to the portion 19 and to the surface of the hole 21.

With reference to FIG. 1, the oscillating element 1 is supported by a screen 22 also having a bell shape and housed within a support frame 23 from an upper wall 24 of which the spindle 2 extends upwardly. Underneath the screen 22 rests on a support element 25 having a central projecting portion 26 within which an intermediate portion 27 of the bush 5 is lodged. The support element 25 rests on a plate 28 having a central part housed partially within a casing 31 of the motor 11. The casing 31 has a cylindrical side wall 32 and a bottom wall 33 in which, by the formation of U-shape perforations 34 there are formed at least three elastically deformable tongues 35 on which the motor 11 rests. The casing 31 and the plate 28 are respectively made of thermoplastic and metal material, utilising injection moulding technology. The casing 31 and the plate 28 are fixed to the frame 23 by suitable means not illustrated for simplicity. This fixing permits the plate 28 to apply a force onto the upper surface of the motor 11 which presses this latter towards the bottom wall 33 elastically deforming the tongues 35. On an intermediate portion 27 of the bush 5 there is formed a worm screw in such a way as to be able to form a coupling with a gear wheel fitted on a rotatable spindle (not illustrated) which can be utilised as part of a kinematic drive chain operable to control sets of number wheels, known per se, operable to give a numerical indication of the distance travelled. Of course, a spring 100 is provided on shaft 2 so as to ensure oscillating motion, and such spring 100 can be constructed and secured in the same manner as spring 27 of U.S. Pat. No. 4,241,607.

The operation of the device described is entirely similar to that of known speed indicator devices, for which reason it is not considered necessary to describe it in detail.

The above described connection between the bush 5 and the shaft 8 avoids the force-fitting of the bush onto the shaft and therefore safeguards the integrity of the shaft of the motor which, as already mentioned, is structurally delicate because of its small dimensions. This connection further avoids expensive detailed working, (for example, keyways) of the motor shaft. Finally, it is to be noted that the single force acting, in use, on the shaft 8 of the motor 11 is that transmitted via the spring 7, a force which gradually increases as the spring winds up, in use, on the shaft 8 itself. Consequently, it is now possible to enlarge the choice of motor to be fitted from among all commercially available types, moreover the assembly of the device in question is more easily automated, with all the advantages which derive therefrom and which in particular beneficially affect the assembly costs and general production costs.

Finally, it is clear that the device described above can have modifications and variations introduced thereto without by this departing from the present invention.

I claim:

1. A speed indicator device for vehicles, of the type in which the speed indication is given over a scale by an index fixed to an oscillating element (1) magnetically drawn by a rotatable permanent magnet (4) the rotation of which is driven by an electric motor (11), characterised by a bush (5) fixed to the said permanent magnet (4) and having an internal hole (6) in which are housed spring means (7) interposed between the said bush (5) and the shaft (8) of the electric motor (11) operable to render the said bush (5) fixed for rotation with the said shaft (8) of the said motor (11).

2. A device according to claim 1, characterised by the fact that the said spring means comprise a cylindrical spring (7) would about the said shaft (8) and having one end (13) fixed to the interior of a seat (14) presented by the said bush (5).

3. A device according to claim 2, characterised by the fact that, in correspondence with a lower portion (9) of the said bush the said hole (6) has a section (12) of greater diameter in correspondence with which the said cylindrical spring (7) is installed, the said end (13) of this latter engaging a radial notch (14) formed on a lower face of the said bush (5).

4. A device according to claim 2 characterised by the fact that the said bush (5) has an upper portion (19) fixed to the said permanent magnet (4) and an intermediate portion (27) in the shape of a worm screw.

* * * * *